A. S. BAKER & W. H. LANDON.
Gang-Cultivators.
No. 154,001. Patented Aug. 11, 1874.
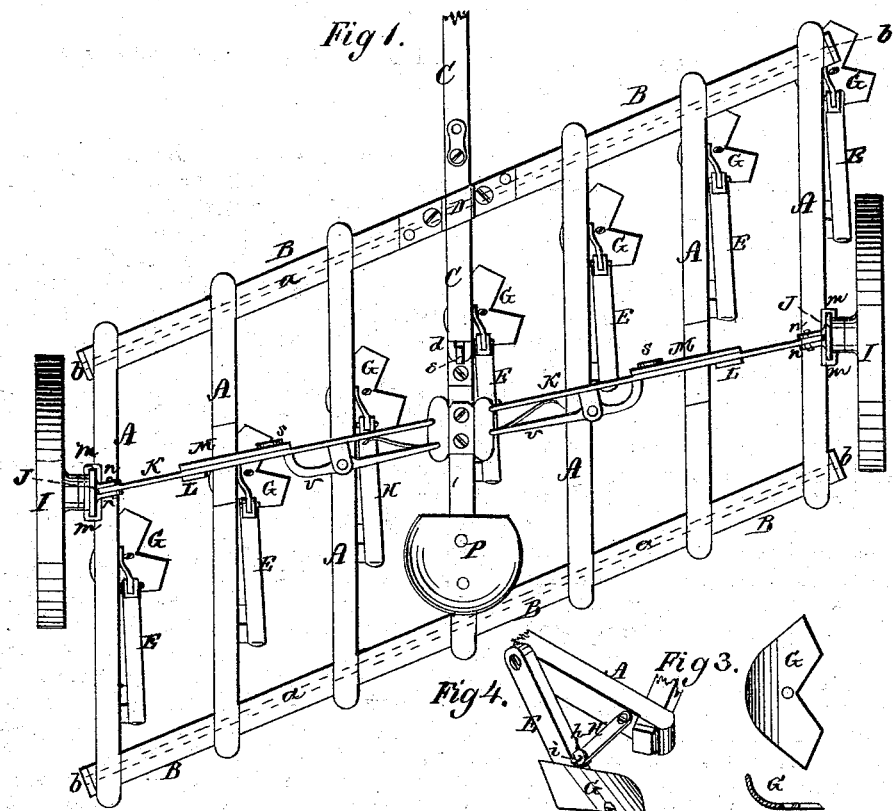
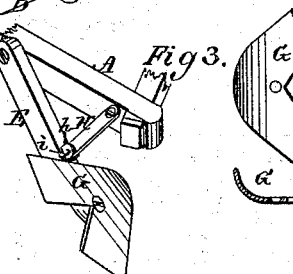
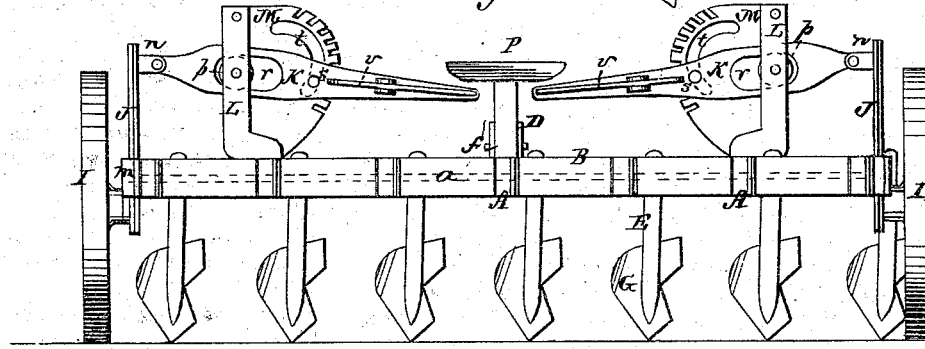
WITNESSES.
J. P. Theodor Lang.
C. L. Evert
INVENTOR
Abner S. Baker
Wm. H. Landon
By Alexander Mason
Attorneys.

UNITED STATES PATENT OFFICE.

ABNER S. BAKER AND WILLIAM H. LANDON, OF KALAMAZOO, MICHIGAN.

IMPROVEMENT IN GANG-CULTIVATORS.

Specification forming part of Letters Patent No. 154,001, dated August 11, 1874; application filed May 5, 1874.

*To all whom it may concern:*

Be it known that we, ABNER S. BAKER and WILLIAM H. LANDON, of Kalamazoo, in the county of Kalamazoo and State of Michigan, have invented certain new and useful Improvements in Gang-Cultivators; and do hereby declare that the following is a full, clear, and exact description thereof, reference being had to the accompanying drawings, and to the letters of reference marked thereon, making a part of this specification.

The nature of our invention consists in the construction and arrangement of a gang-cultivator, as will be hereinafter more fully set forth.

In order to enable others skilled in the art to which our invention appertains to make and use the same, we will now proceed to describe its construction and operation, referring to the annexed drawing, in which—

Figure 1 is a plan view, and Fig. 2 a rear elevation, of our cultivator. Figs. 3 and 4 are detached views of certain parts thereof.

The frame of our cultivator is made in diamond form, and consists of a series of parallel bars, A A, running parallel with the line of draft of the machine, and connected by means of rods a a, passing through their ends and through short bars B B, placed between them, the whole fastened by nuts b b. C represents the tongue, upon the under side of which, at the rear end, is secured a metal plate or bar, d, extending beyond the end of the tongue, and having a slot in its rear end. This is to be fastened on a hook, e, secured upon the top of the center bar A. The tongue C passes through a metal loop or frame, D, attached to the front side of the frame, and in which the tongue may be raised and lowered, as desired, and held by a pin, f.

To each bar A is pivoted a plow foot or standard, E, with the plow G fastened to its lower end; and this standard is held in proper position for plowing by means of a brace, H, secured to the side of the bar A, and fastened by means of a wooden pin, i, to or between ears h on the front of the plow-standard E. By this means, if the plow strikes any obstruction, the pin i will break and cause the plow and whole standard to turn on the pivot, preventing all breakage. The plows or shovels G are constructed, as shown in Figs. 3 and 4, in mold-board form, and are made reversible on either side, so that, by changing the points in working corn, the furrow may be thrown to or from the corn. The standards or feet E, with their plows, are arranged, as shown, one in rear of the other, so as to let one furrow fall in after the leading plow or shovel has turned its furrow, thus turning a succession of furrows, and thereby making it practical for summer following as well as cultivating corn. I I represent the driving-wheels of the cultivator. Each wheel is placed upon a spindle projecting outward from the lower end of a flanged bar or plate, J, placed vertically in guides m m, secured to the end of the frame. At the upper end, on the inner side of the bar J, project two ears, n n, between which is pivoted one end of a lever, K. This lever passes between a standard, L, and a plate, M, secured upon one of the bars A. p represents a roller placed in an elongated slot, r, in the lever K, and having its journal-bearings in the standard L and plate M, as shown. The lever K is held close to the plate M by means of a headed pin, s, passing through a curved slot, t, in the plate. On the lever K is pivoted a spring-dog, v, which enters notches in the edge of the plate M, to hold the slide J and wheel I at any desired height, or, in other words, to raise and lower the cultivator-frame and hold it as required. The roller or wheel p forms or acts as a fulcrum, upon which the lever K turns, and also admits of a sliding motion to the lever, thereby preventing the slide J from binding, and at the same time allowing it to work with facility. P is the driver's seat, arranged upon the center bar A, in rear of the tongue C, and within easy reach of the levers K K.

Having thus fully described our invention, what we claim as new, and desire to secure by Letters Patent, is—

The combination, with the wheel I and slide J, of the slotted lever K, wheel or roller p, headed pin s, slotted and notched plate M, and standard L, all substantially as and for the purposes herein set forth.

In testimony that we claim the foregoing we have hereunto set our hands this 13th day of March, 1874.

ABNER S. BAKER.
WILLIAM H. LANDON.

Witnesses:
AMOS D. ALLEN,
HENRY H. BOEKELOO.